United States Patent [19]

Laurent et al.

[11] 4,341,511
[45] Jul. 27, 1982

[54] DEVICE FOR AUTOMATIC ADJUSTMENT OF AN INJECTION MOLDING PRESS

[75] Inventors: Jean Laurent, Oyonnax; Bernard Monnet, Bellignat; Philippe Pertuis, Oyonnax, all of France

[73] Assignee: Pont-a-Mousson, Nancy, France

[21] Appl. No.: 195,167

[22] Filed: Oct. 8, 1980

[30] Foreign Application Priority Data

Oct. 10, 1979 [FR] France .................. 79 25727

[51] Int. Cl.³ .................................................. B29F 1/06
[52] U.S. Cl. ............................... 425/150; 425/451.6; 425/593
[58] Field of Search ................ 425/451.6, 150, 593

[56] References Cited

U.S. PATENT DOCUMENTS 3,642,405  2/1972  Eggenberger ............... 425/451.6

*Primary Examiner*—Thomas P. Pavelko
*Attorney, Agent, or Firm*—Sughrue, Mion, Zinn, Macpeak & Seas

[57] ABSTRACT

Adjustment device for the locking jack 9 of a molding press comprising, on a base 1, a mold 4 held by a fixed plate 2 and a movable plate 3 controlled by a rapid movement mechanism 10-13, itself connected to a fixed plate 5 via a movable plate 8 subjected to the action of the locking jack. The adjustment device includes a stem 17 which frictionally slides in relation to the base 1 and which is fitted with arms 18, 19 situated between two control contactors 15 and 16 of the locking jack and connected to the movable plate 8. The device provides automatic adjustment of the control of the locking jack 9 in accordance with the thickness of the mold.

7 Claims, 6 Drawing Figures

DEVICE FOR AUTOMATIC ADJUSTMENT OF AN INJECTION MOLDING PRESS

BACKGROUND OF THE INVENTION

This invention relates to a device for the automatic adjustment of the movement and locking mechanism of an injection molding press for plastics, elastomers or the like.

Injection molding presses generally comprise a fixed plate and a movable plate each bearing, respectively, the two halves of a mold, a second fixed plate or bed connected to the movable mold bearing plate, and a mechanism for moving and locking the movable half mold against the fixed half mold. The moving and locking mechanism is often formed by a high force locking jack with a small range of movement which is connected to the bed, and a second movable plate connected to the movable half mold bearing plate by two articulated levers forming an elbow joint, the latter being controlled by a low force jack with a large range of movement. The movement of the movable half mold towards the fixed half mold is implemented by the elbow jointed levers, whereas the locking jack provides the pressurization of the two half molds during the injection and during the detaching of the two half molds after injection.

When changing the molds in such a press, the thickness of the molds generally varies and it is necessary to carry out adjustments of the movement of the locking jack so that, when the two half molds are brought together by the elbow jointed levers, there is only a small space remaining between the two half molds. This space should be sufficiently large for the straight alignment of the two levers to be correctly effected during the closing of the mold, but small enough to both minimize the range of movement of the locking jack and to prevent foreign objects from entering between the two half molds. These two conditions are necessary as, on the one hand, the levers should be aligned so that the force of the locking jack is correctly applied to the two half molds, and on the other hand, the movement of the locking jack should be as small as possible to allow it to be rapidly placed under pressure. Since the force created by this locking jack is considerable, if a foreign object were to be introduced between the two half molds it could cause destruction or deformation of the mold.

The adjustments due to the change in thickness of the molds are generally complex and therefore lengthy to carry out, and must be made each time the mold thickness is changed.

SUMMARY OF THE INVENTION

The object of the present invention is to eliminate these manual adjustments and provide an automatic adjustment device for the movement and locking mechanism of a molding press comprising, on a base, between a fixed plate or bed and a movable half mold bearing plate, a second movable plate connected to the fixed plate by a locking jack and to the movable half mold bearing plate by a rapid movement linkage. The adjustment device itself comprises two contactors for controlling the locking jack, borne by the second movable plate, situated on either side of an armed stem for engaging the contactors. The stem is mounted to frictionally slide on the base.

By means of this device the adjustment of the control of the locking jack is obtained automatically at the time of a change in the thickness of a mold and without any manual adjustment.

DETAILED DESCRIPTION OF THE PREFERRED EMBODIMENT

Figure 1:
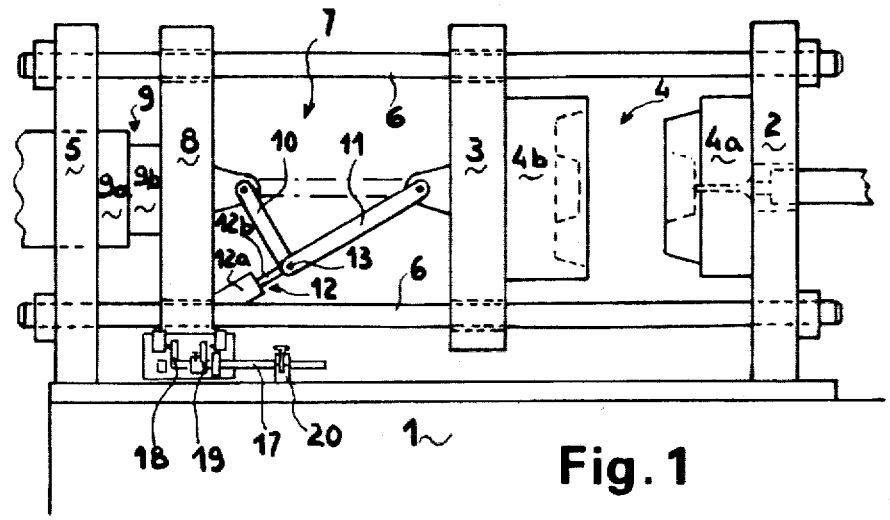
FIG. 1 is a schematic elevation of an injection molding apparatus provided with an automatic adjustment device according to the invention.
Figure 2:
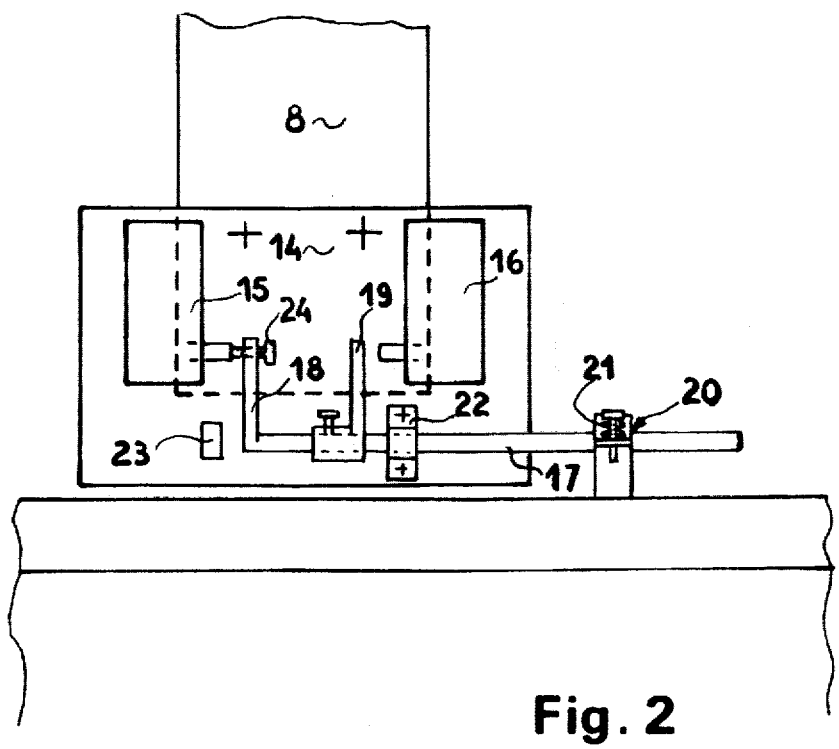
FIG. 2 is a schematic elevation, on a larger scale, of the automatic adjustment device.

According to FIG. 1, the adjustment device according to the invention is applied to an injection molding apparatus comprising, on a base 1, a fixed end plate 2 and a first movable plate 3, respectively mounting the two parts 4a-4b of a mold 4, a further fixed end plate or bed 5, four horizontal columns 6 connecting the plate 2 and the bed 5 and on which the movable plate slides, and a mechanism 7 for moving and locking the movable half mold 4b against the fixed half mold 4a.

The moving and locking mechanism 7 includes a second movable plate 8 slidably disposed on the four columns 6 and controlled by a double acting jack 9 having a cylinder 9a connected to the bed 5 and a piston 9b connected to the plate 8. The latter is in turn coupled to movable plate 3 by two articulated levers 10, 11 controlled by a double acting jack 12 having a cylinder 12a connected to plate 8 and a piston 12b connected to the axis 13 joining the two levers.

The adjustment device of the present invention, as best shown in FIGS. 2-6, comprises a support plate 14 mounted on the side of the movable plate 8 and carrying two oppositely disposed electrical contactors 15 and 16 for controlling the jack 9, respectively connected to two supply circuits (not shown) for forward and backward movement of the piston 9b of the jack. A device for actuating the contactors 15, 16 is formed by a stem 17 having two perpendicular arms 18 and 19 intended to respectively engage, but not simultaneously, the contactors 15 and 16. The stem 17 is slidably mounted but with relatively strong frictional restraint in a resilient clamp 20 fixed to the base 1. The resilient clamping is implemented by the interposition of flexible washers, for example of the Belleville type. The stem 17 also slides in guide sleeve 22 which is borne by support plate 14 and which forms a stop for arm 19 of the stem 17. This stop is situated such that, when contactor 16 is engaged, arm 19 abuts the stop.

The support plate 14 also carries a projection which forms a stop 23 for arm 18. This stop is situated such that arm 18 is spaced therefrom by a distance e when it engages contactor 15.

Figure 3:
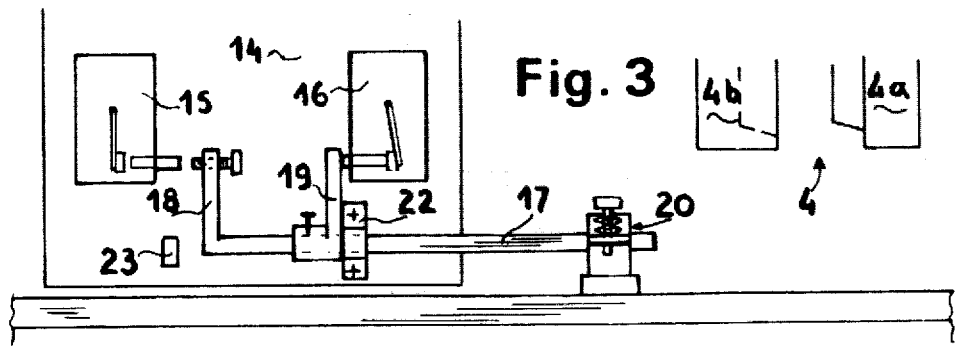
FIGS. 3 to 6 are schematic elevations of the automatic adjustment device in various positions.
Figure 4:
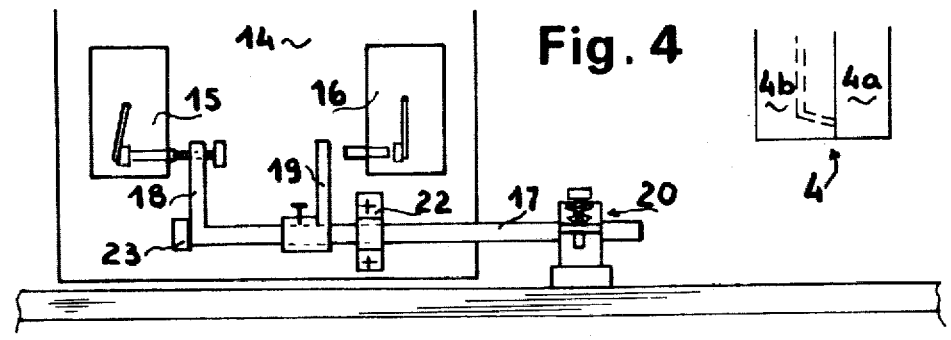
Figure 5:
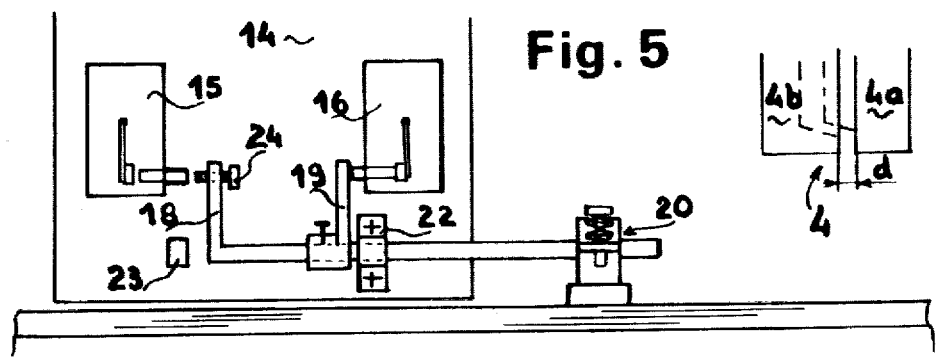
Figure 6:
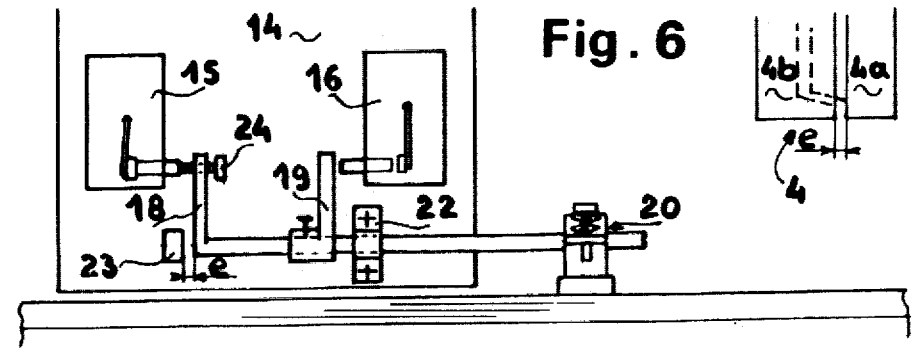

The operation of the automatic adjustment device for the moving and locking mechanism is as follows. During the mounting of a mold 4 on plates 2, 3, the plates are separated as much as possible by retracting plate 3. This is caused by the full retraction of piston 9b of locking jack 9, and by bending the elbow jointed levers 10, 11 by retracting piston 12b of jack 12. With the retraction of piston 9b the plate 8 also moves backwards or to the left in the drawings, and carries with it the support plate 14 with its contactors 15, 16 and the stops 22, 23. As a result, stop 22 abuts arm 19 borne by stem 17 and, due to the high force of jack 9, causes stem 17 to frictionally slide in clamp 20. This position is shown in FIG. 3.

After properly mounting half molds 4a and 4b on the two plates 2 and 3, respectively, the automatic adjustment of the moving and locking device is effected by extending the piston 12b of jack 12 which brings into alignment the articulated levers 10 and 11. When the rods are aligned straight, piston 9b of the locking jack 9 is extended until the two half molds are in contact with one another. During such movement the plate 8 also moves to the right in the drawings, together with the support plate 14, its contactors 15, 16 and the stops 22, 23. Under the effect of such movement the contactor 15 is engaged by arm 18 and the stop 23 pushes on stem 17 causing, due to the considerable force of jack 9, the forward movement to the right of stem 17 in the clamp 20 (shown in FIG. 4).

The mold thus being closed, the adjustment of the locking and moving device is completed, and takes into account the thickness of the mold 4 borne by plates 2 and 3. From that moment, the machine may begin its normal manufacturing cycle. These setup movements of jack 9 are manually controlled by overriding its automatic control circuits.

Thus, after injection of the material in the closed mold and manufacture of the molded object, the piston 9b is retracted by a distance d necessary for the detachment of the object from the mold. At the time of this withdrawal, the plate 8 also moves backward the same distance d taking with it contactors 15 and 16 in such a manner that the contactor 15 is disengaged whereas contactor 16 becomes engaged by arm 19 which then operates a control circuit to halt the backward movement of piston 9b (shown in FIG. 5).

To remove the manufactured object from the mold, it suffices to move plate 3 backward by bending the elbow jointed levers 10, 11 by retracting piston 12b of jack 12. The mold is therefore fully open and the manufactured part may be removed.

To carry out the manufacture of a new object with the same mold, the closing of the mold is effected as follows. Piston 9b of locking jack 9 is extended, which also causes the forward movement of plate 8 and its support plate 14, until contactor 15 engages arm 18 of stem 17 which halts the supply of pressurized fluid to locking jack 9. The levers 10, 11 are then aligned by jack 12 to the position shown in FIG. 6. In this position the space between the molds is very small and equal to play e. When the rods are aligned, the locking jack 9 is then again pressurized so that the two half molds abut one another and so that under the effect of the forward movement of the plate 8 and its support 14, stop 23 abuts the extremity of stem 17 without moving the stem since this position corresponds to the closed position of the mold during its assembly (position shown in FIG. 3).

By using this automatic device for adjustment of the moving and locking device, it is no longer necessary to carry out manual adjustments when changing molds, in particular when the mold thickness changes. In effect, at the time of assembly of the mold the positioning of stem 17 in relation to the box is carried out in accordance with the thickness of the mold and cannot disadjust itself during the manufacturing cycle since the movement of stem 17 in relation to the base 1 is restrained by clamp 20 which prevents any sliding of the stem due to the abutment forces created by contactors 15 and 16. The movement of stem 17 only takes place under the action of stops 22 and 23, whose movement is caused by locking jack 9. The presence of these stops provides for the adjustment movement of stem 17 without the destruction of contactors 15 and 16.

The retraction of piston 9b of jack 9, after injection of the material, to provide detachment of the movable half mold 4b in relation to the movable half mold 4a, can be modified by moving arm 19 borne by stem 17 in relation to arm 18. Thus, if arm 19 is brought closer to arm 18, the detachment distance d is increased, and vice versa.

It is also possible to adjust the play e which is intended to cause the alignment of small positioning rods during the closing of the mold, by modifying the pressure of arm 18 on the contactor by means of a screw 24 which abuts the contactor 15.

Although in the embodiment described the frictional clamp 20 of stem 17 is rendered resilient by Belleville washers, it is possible to replace this by any other suitable device preventing the sliding of stem 17 under the action of the contactors but allowing the sliding of this stem under the action of stops 22 or 23 caused by locking jack 9.

The present invention, although described above for an elbow jointed movement device, can be applied to any other device for transmission of the locking force to the movable plate, such as for example a turning disc borne by the second plate 8 and support stems borne by the movable plate 3 and engaged with the disc.

What is claimed is:

1. An automatic adjustment device for a movement and locking mechanism of an injection molding press including a support base (1), a fixed plate (5) mounted on the base, a first movable half mold bearing plate (3), and a second intermediate movable plate (8), connected to the fixed plate by a locking jack (9) and to the first movable plate by a rapid movement linkage (10–13), the improvement comprising two spaced contactors (15, 16) mounted to the second plate for controlling the extension and retraction of the locking jack, and contactor engagement means disposed between the contactors, said contactor engagement means being frictionally and slidably mounted on said base at a position to be pressed upon by said contactors during movement of said second plate, wherein said contact engagement means is automatically slidably moved to an operative position by movement of said second plate.

2. The automatic adjustment device of claim 1, the improvement further comprising a pair of spaced stops (22, 23) mounted to the second plate for abutting and moving the contactor engagement means.

3. The automatic adjustment device of claim 1 or 2, wherein the contactor engagement means comprises an elongated stem (17) having two spaced perpendicular arms (18, 19) for abutting and actuating the contactors (15, 16).

4. The automatic adjustment device of claim 3, wherein the stem is mounted on the base by a resilient clamp (20).

5. The automatic adjustment device of claim 4, wherein an arm of the stem carries an adjustment screw (24) for engaging and actuating an associated contactor.

6. The automatic adjustment device of claim 4, the improvement further comprising means for adjusting the distance between the arms.

7. The automatic adjustment device of claim 6, wherein the rapid movement linkage comprises two articulated levers (10, 11) connected between the first and second movable plates, and a jack (12) mounted on the second movable plate for controlling the movement of said levers.

* * * * *